(12) United States Patent
Fangmeier

(10) Patent No.: US 7,527,073 B2
(45) Date of Patent: May 5, 2009

(54) BACKFLOW PREVENTER

(75) Inventor: Martin Fangmeier, Auggen (DE)

(73) Assignee: NEOPERL GmbH, Müllheim (DE)

( * ) Notice: Subject to any disclaimer, the term of this patent is extended or adjusted under 35 U.S.C. 154(b) by 233 days.

(21) Appl. No.: 10/550,320

(22) PCT Filed: Apr. 7, 2004

(86) PCT No.: PCT/EP2004/003724

§ 371 (c)(1),
(2), (4) Date: Sep. 22, 2005

(87) PCT Pub. No.: WO2004/090394

PCT Pub. Date: Oct. 21, 2004

(65) Prior Publication Data

US 2006/0237076 A1  Oct. 26, 2006

(30) Foreign Application Priority Data

Apr. 12, 2003  (DE)  .................... 103 16 903

(51) Int. Cl.
*F16K 15/14* (2006.01)
(52) U.S. Cl. ................. 137/853; 137/512.15; 137/859
(58) Field of Classification Search ............ 137/512.15, 137/853, 859
See application file for complete search history.

(56) References Cited

U.S. PATENT DOCUMENTS 2,938,532 A   5/1960  Fraser
3,324,877 A   6/1967  Bochan
5,551,483 A * 9/1996  Hochstrasser ............... 137/846
6,202,901 B1  3/2001  Gerber et al.
6,848,471 B2 * 2/2005  Floh et al. ............. 137/512.15

FOREIGN PATENT DOCUMENTS

| CH | 572 179 A5 | 1/1976 |
| DE | 842 567 C | 6/1952 |
| DE | 1 154 982 B | 9/1963 |
| DE | 14 75 998 B | 11/1970 |
| EP | 0 284 805 A2 | 10/1998 |
| FR | 1 457 038 A | 7/1966 |
| GB | 860 026 A | 2/1961 |
| GB | 875 034 A | 8/1961 |

* cited by examiner

Primary Examiner—Kevin L Lee
(74) Attorney, Agent, or Firm—Volpe and Koenig, P.C.

(57) ABSTRACT

The invention relates to a backflow preventer (1) integrateable into a gas or liquid pipeline (2). The inventive backflow preventer consists of a closing body (3) which is embodied in the form of a hollow body which is open on a drainage side thereof and defines a passage channel (5) between itself and the central counterpart (4) opposite thereto. Said closing body (3) is displaceable by a flow medium flowing through the passage channel (5) in a flow direction (Pf 1) from a sealing contact thereof with said counter part (4) of the closing body to the open position thereof against the opposing force of elasticity and o r stability thereof. Said backflow preventer (1) is easily producible even with a small number of components and is characterised by a high flow and low pressure loss.

12 Claims, 2 Drawing Sheets

BACKFLOW PREVENTER

BACKGROUND

The invention relates to a backflow preventer, which can be integrated into a gas or liquid line and which is provided with a closing body, embodied as a hollow body open at the drainage side. The closing body limits a passage channel between itself and a central closing body counterpart, with the closing body being displaceable by the flow medium flowing through the passage channel from a closing position, contacting the closing body counterpart in a sealing manner, into an opening position against the restoring force of its own elasticity and/or own stability.

Such backflow preventers are inserted into sanitary water lines, for example, in order to prevent the backflow of water and in particular the return suction of waste water into the drinking water lines. Such backflow preventers open when the water flows to an outlet. Here, the closing body is displaced by the flow medium, flowing in the flow direction or in the direction towards the outlet, from its closed position into the open position against the restoring force of a return spring. In the event of an undesired backflow, however, the closing body is pressed firmly against the valve seat and kept in its closing position, thus blocking the way back for the return flowing water.

The backflow preventers of prior art are usually comparatively complicated and comprise multiple components, thus they are expensive in their production. Therefore, the object of the invention is to provide a backflow preventer characterized in a simple construction, with this simple construction favoring low production costs and operation without malfunction.

From CH 572 179 A1 a backflow preventer of the type mentioned at the outset is known, which can be inserted into a gas or liquid line. The known backflow preventer is provided with a cone-shaped closing body on its drainage side which is made from an elastic material, limiting a passage channel between itself and a central closing body counterpart. In a closing position the closing body contacts the closing body counterpart in a sealing manner, which has a cone-shaped exterior contour and is provided circumference penetrations at its exterior for the fluid flowing through the closing body counterpart. The closing body, which contacts the closing body counterpart and thus closes the penetrations in a tightly sealing manner, is displaced by the fluid flowing through the passage channel in the flow direction against the restoring force of its own elasticity in the opening position. In contrast thereto, the fluid flowing opposite the flow direction is able to additionally press the closing body against the exterior circumference of the closing body counterpart.

The use of such backflow valves in the field of one-lever mixing faucets is frequently plagued with the problem that during the closing of the cold water or warm water side, the water, which is enclosed between the closed backflow valve, on the one hand, and the also closed valve seat, on the other hand, is heated to a large extent by exterior influences, until system pressure develops which leads to damages in the weakest part of the supply line and, thus, frequently at the backflow valve. Ultimately, this can lead to a blockage of the supply line or an also undesired cross-flow.

Due to the fact that the closing body provided in CH 572 179 A5 is pressed more and more tightly against the exterior circumference of the closing body counterpart by the pressure of the fluid flowing back against the flow direction, undesired high pressure can develop in the backflow preventer known from CH 572 179 A5.

Two backflow preventers having a construction to that described in CH 572 179 A5 are known from DE 1 154 982 B and DE 842 567 C, with their use also being subject to the disadvantages and risks described above.

SUMMARY

Therefore, the object is to particularly provide a backflow preventer of the type mentioned at the outset, having a simple design which promotes low production costs and an operation free from malfunctions, with the backflow preventer also effectively counteracting any excessive increase in interior pressure.

In particular, the solution to this objective according to the invention provides in the backflow preventer of the type mentioned at the outset that the closing body, in its unstressed closing position, initially only contacts with a partial area, embodied as a sealing lip, a partial or end region of the closing body counterpart, which narrows in a direction of the flow, and which can be pressed under the stress of the load of fluid flowing back against the flow direction into a buffer volume for the back flowing fluid at the drainage side so that it can additionally be pressed with a partial region of its longitudinal extension against the closing body counterpart.

The closing body of the backflow preventer according to the invention is embodied as a hollow body, open on the drainage side, and encompassing a central closing body counterpart. The hollow body initially contacts only with a partial section, embodied as a sealing lip, a partial or end section of the closing body counterpart, still not subjected to any strong backflow. Under the stress of the fluid flowing back opposite the flow direction, the closing body is additionally pressed against the closing body counterpart with a partial section of its longitudinal extension, blocking the return path of the back flowing medium. Here, not only is the sealing surface between the closing body and the closing body counterpart enlarged and the sealing effect effectively increased, also between the exterior of the closing body pressed towards the closing body counterpart, on the one hand, and the encompassing interior wall, on the other hand, a buffer volume on the drainage side is opened for the back flowing fluid, and thus an undesired and potentially damaging increase in interior pressure is compensated. When the fluid flows in the flow direction, though, the closing body is displaced by the flowing medium flowing through the passage channel from its closing position, in which it contacts the closing body counterpart in a sealing manner, into an opening position against the restoring force of its own elasticity and/or own stability. Here the closing body and the closing body counterpart limit a passage channel, in which a gaseous or liquid flow medium flows in the flow direction or outlet direction.

Therefore, due to the fact that the closing body is embodied as a hollow body and is made from an inherently elastic material and due to the fact that in the backflow preventer according to the invention a displaceable valve body made from a hard metal can be omitted, an undesired development of noise is also avoided during the repositioning of the closing body from the open position into its closed position and pressure waves which develop by a fast closing of closing members at the drainage side are dampened. The pressure wave of backflow preventers of prior art, caused by the fast closing of a closing member at the drainage side and recognized as a disturbing noise, is reduced and effectively dampened in the backflow preventer according to the invention by the partial displacement of the buffer volume provided according to the invention.

In order for the closing body to be able to execute the high number of opening and closing motions following in rapid sequence it is advantageous for the closing body to be produced from an elastic material. In order for the medium, flowing back at high pressure, not to be able to displace the closing body counterpart beyond the narrowing section, it is advantageous for the sealing lip to be provided, at its free edge region contacting the closing body counterpart, with a reinforcement at the edge which counteracts a widening of the circumference of the edge region.

The reinforcement of the edge can be embodied as an annular and non-stretchable material inlay in the closing body edge region, for example. The simple production of the backflow preventers according to the invention is promoted, though, when the edge reinforcement is embodied as a circumferential, cross-sectional expansion or cross-sectional enlargement of the closing body.

A preferred embodiment according to the invention provides for the closing body to have a rounded end region and to be embodied preferably in a drop-shaped manner. In this embodiment the high throughput and the little loss in pressure of the backflow preventer according to the invention is favored even more.

In order to hold the closing body counterpart in the desired central position inside the closing body, embodied as a hollow body, it is advantageous for the central closing body counterpart to be connected to a through flow plate, provided with flow openings which open into the passage channel.

The through flow plate, in the area of the passage channel, is characterized in a flow resistance being as little as possible, when the through flow plate is embodied in the area of the passage channel as a sieve or perforated plate with flow openings embodied preferably honeycomb-shaped.

The simple production of the backflow preventer according to the invention is favored even more, when the through flow plate and the closing body counterpart are connected to one another in one piece.

An embodiment according to the invention which is produced in a particularly simple and cost-effective manner, provides for the closing body to be held to the exterior circumference of the through flow plate.

In order to be able to produce the backflow preventer according to the invention with little expense and from only few components it is advantageous for the closing body with its closing body section held to the through flow plate to contact the interior circumference of the gas or liquid pipeline. In this embodiment a separate annular seal can be omitted. Instead of such an annular seal, the closing body performs the function with its closing body section contacting the interior circumference of the gas or liquid line.

In order to enhance such sealing function even further it is advantageous for the edge region of the face of the closing body, contacting upstream the gas or liquid line in a sealing manner, is embodied as a circumferentially extending cross-sectional enlargement. Here, a particularly advantageous further development according to the invention provides for the closing body to be held with its cross-sectional enlargement in a holding groove provided at the exterior circumference of the through flow plate.

The reduced production expense is enhanced even further when the backflow preventer is essentially formed in two parts and the closing body, on the one hand, is provided both with a closing body counterpart and, on the other hand, with the through flow plate connected thereto in a single piece.

BRIEF DESCRIPTION OF THE DRAWINGS

Additional features of the invention are discernible from the following description of an embodiment according to the invention in connection with the claims and the drawing. The individual features can be embodied alone or combined in an embodiment according to the invention.

In the drawings:

In FIGS. 1 through 3 the backflow preventer is shown, which can be inserted into a gas or liquid line, and here it is integrated in a sanitary water line 2. The backflow preventer 1 is provided with a closing body 3 embodied as an essentially pot-shaped hollow body open at the drainage side.

DETAILED DESCRIPTION OF THE PREFERRED EMBODIMENTS

Figure 1:
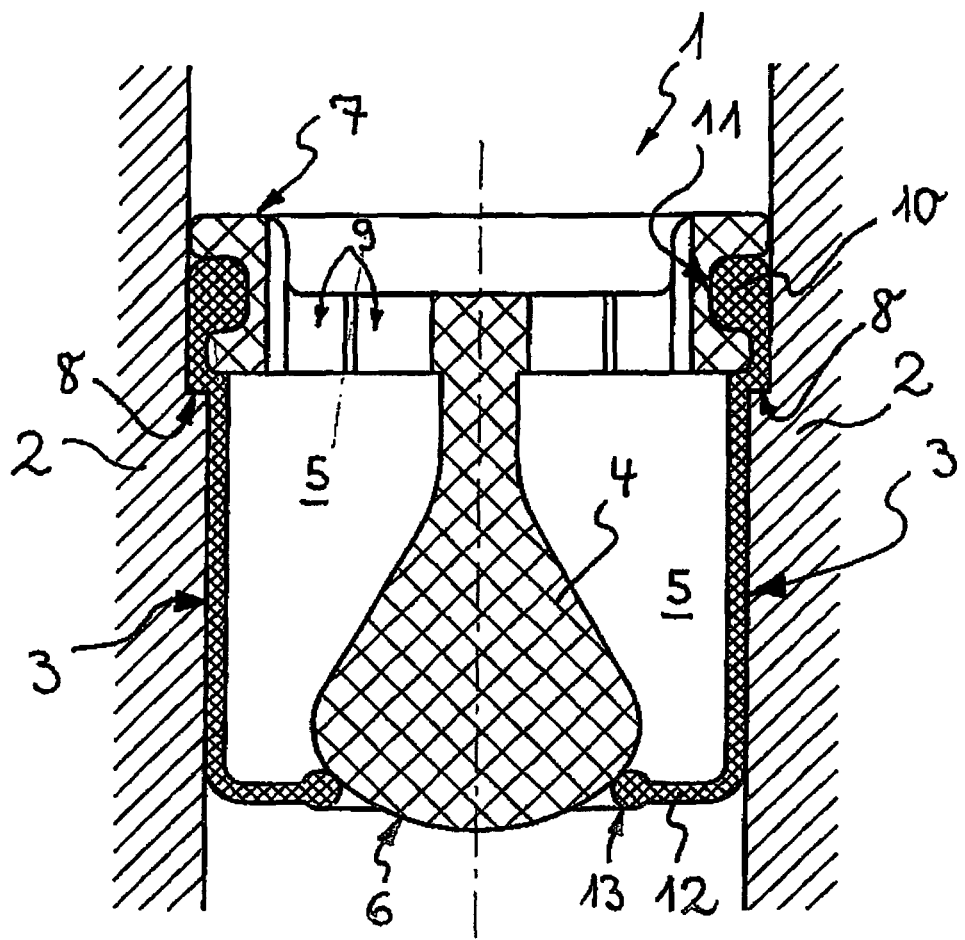
FIG. 1: a backflow preventer, which can be inserted into a gas or liquid pipeline, shown in a cross section, in its original or closed position not subjected to any flow medium

As clearly discernible from the closed or normal position of the backflow preventer 1, shown in FIG. 1 unimpinged by the flow medium, the closing body 3 limits a passage channel 5 between itself and a central closing body counterpart 4.

Figure 2:
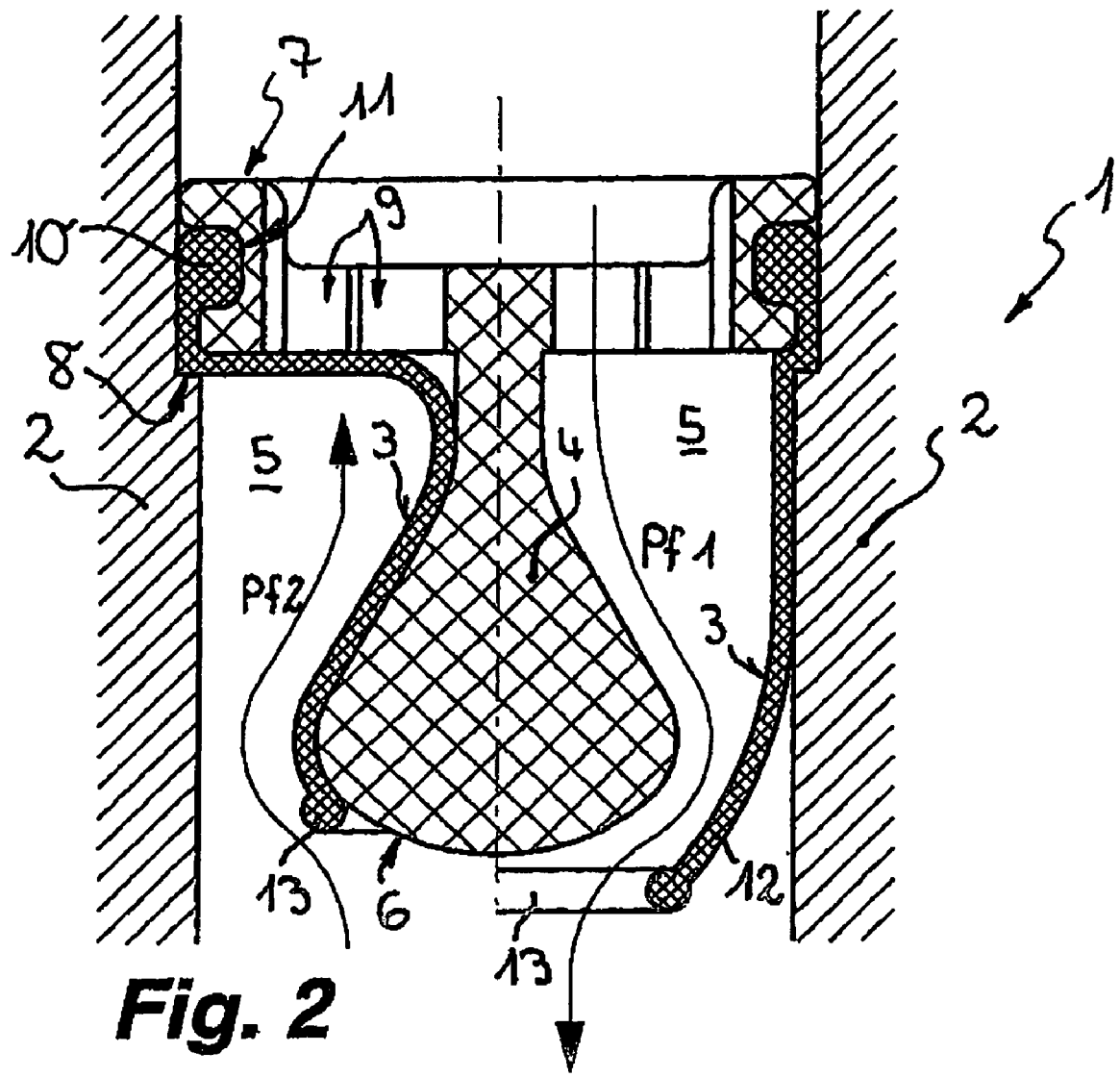
FIG. 2: the backflow preventer according to FIG. 1, with the backflow preventer is shown in its closed position on the left of the central axis and in its open position on the right of the central axis.

In the left half of FIG. 2 it is shown how the closing body 3, made from an elastic or shape-elastic material is additionally defined in the closed position by the back flowing flow medium impinging the closing body 3 on its exterior, causing a large partial section of its longitudinal extension to be pressed against the closing body counterpart 4. Here, the closing body contacts the closing body counterpart 4 under the pressure of the fluid flowing back opposite the flow direction such that between the closing body and the encompassing interior wall of the pipeline a downstream buffer volume is opened for the back flowing fluid. By opening the downstream buffer volume, any undesired increase in interior pressure is compensated, which otherwise might damage the gas or liquid pipeline and/or the functional unit integrated therein. Across therefrom, the backflow preventer 1 is shown in the right half of FIG. 2 in its opening position. Here it is obvious that the closing body 3 can be displaced by the flow medium flowing in the flow direction Pf1 through the passage channel 5 from a closed position, contacting a closing body counterpart 4 in a sealing fashion, into an open position against the restoring force of its own elasticity or its own stability.

In FIGS. 1 and 2 it is discernible that the closing body counterpart 4 made from a dimensionally stable material, has an end region, which narrows in the flow direction Pf1 in a rounded fashion, here. For this purpose, the closing body counterpart 4 is embodied essentially drop-shaped. Here, the closing body counterpart 4 is connected in one piece with the upstream tip of a drop-shaped through flow plate 7, aligned laterally to the flow direction Pf1, which contacts with its edges at least one rest, here embodied as an annular flange 8, in the gas or liquid line 2.

Figure 3:
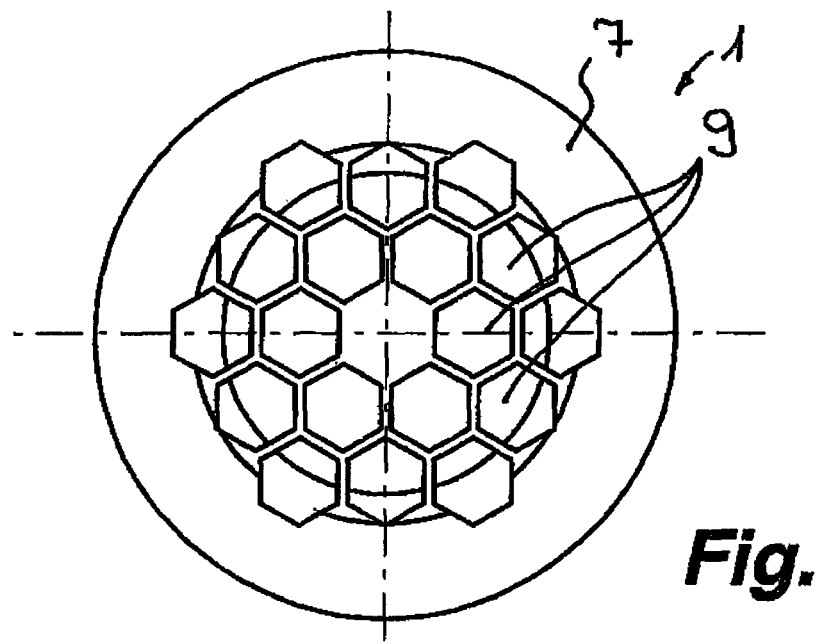
FIG. 3: a top view of the backflow preventer according to FIGS. 1 and 2 on a through flow plate provided upstream.

It is possible for at least one feeder channel to be penetrated by the closing body counterpart 4, which opens into the passage channel 5. However, here the through flow plate 7 is provided with penetrating openings 9, that open into the passage channel 5. From the top view onto the upstream face of the through flow plate 7, shown in FIG. 3, it is discernible that in the area of the passage channel, said through flow plate is embodied as a sieve or perforated plate with preferably honeycomb-shaped penetrating holes 9.

The closing body 3 is held to the exterior circumference of the through flow plate 7. Here, the closing body 3 contacts with its closing body section, held to the through flow plate 7, the interior circumference of the gas or liquid pipeline 2 in such a sealing manner that any additional annular seal between the backflow preventer 1 and the gas or liquid pipeline 2 can be omitted.

In order to improve the sealing effect of the closing body 3 in this area even more, the edge region of the face of the closing body 3, upstream contacting the gas or liquid line 2 in a sealing manner, is embodied as an annular-shaped encircling cross-sectional enlargement 10. Here, it is discernible in FIGS. 1 and 2 that the closing body 2 is held with its cross-sectional enlargement 10 to a mounting groove 11 provided at the exterior circumference of the through flow plate 7.

At its downstream partial region, the closing body 3 is embodied as a narrowed and rounded sealing lip 12, which contacts the end region 6 of the closing body counterpart 4. In order for the closing body 3 to additionally be pressed against the closing body counterpart 4, serving as a valve seat, by the flow medium impinging it from the outside and flowing in the opposite flow direction Pf2, and thus also preventing the edge region of the closing body 3, contacting the closing body counterpart 4 with the edge region from being pushed by the high pressure of back flowing medium, over the tapering end section 6 of the closing body counterpart 4, the sealing lip 12 is provided at its free edge region contacting the closing body counterpart 4 with an edge reinforcement 13 counteracting any expansion of the edge region circumference. This edge reinforcement 13 is here embodied as a circumferentially extending cross-sectional expansion or cross-sectional enlargement of the closing body 3.

The closing body 3 of the backflow preventer 1 shown here is embodied as a hollow body open at the drainage side, encompassing the central closing body counterpart 4. The closing body 3 and the closing body counterpart 4 define between each other the passage channel 5 through which a gaseous or liquid flow medium flows in the flow direction or towards the outlet Pf 1. Here, the closing body 3 is displaced by the flow medium flowing through the passage channel 5 from the closing position, sealing at the closing body counterpart 4, against the restoring force of its own elasticity and/or own stability into its opening position. However, in the event of backflow of the flow medium in the opposite direction Pf2, the closing body 3, impinged on the outside by the back flowing medium, is held in its closing position, which blocks the backward flow of the back flowing medium.

A particular advantage of the backflow preventer 1 shown here is the fact that it can be produced inexpensively and from very few components. The backflow preventer 1 shown here is embodied in two components and essentially comprises, on the one hand, the closing body counterpart 4 connected in one piece to the through flow plate 7 and, on the other hand, the closing body 3. The backflow preventer shown here is characterized in a high flow capacity and a comparatively low pressure loss.

The invention claimed is:

1. Backflow preventer (1), which can be inserted into a gas or liquid line (2), comprising a closing body (3) embodied as a hollow body open on a drainage side, which limits a passage channel (5) between the closing body and a central closing body counterpart (4), the closing body (3) being displaceable by a flow medium flowing through the passage channel (5) in a flow direction (Pf 1) from a closed position, contacting the closing body counterpart (4) in a sealing manner, into an open position against a restoring force of an elasticity and/or a stability of the closing body, the closing body (3), in an unstressed closed position, initially contacts only a partial or edge region (6) of the closing body counterpart (4) with a partial region embodied as a sealing lip (12) of the closing body and can additionally be pressed against the closing body counterpart (4) with a partial region of a longitudinal extension thereof under a pressure of the fluid flowing against the flow direction (Pf 1), opening a downstream buffer volume for back flowing fluid, the closing body (3) is located at a fixed position, at a peripheral edge (10) thereof, relative to the closing body counterpart (4) in the backflow preventer in the gas or liquid line, and the central closing body counterpart (4) is connected to a through flow plate (7).

2. A backflow preventer according to claim 1, wherein a free edge region of the sealing lip (12), which contacts the closing body counterpart (4), is provided with an edge reinforcement (13) to compensate against expansion of an edge region circumference.

3. A backflow preventer according to claim 2, wherein the edge reinforcement (13) is embodied as an annular cross-sectional expansion or a cross-sectional enlargement of the closing body (3).

4. A backflow preventer according to claim 1, wherein the closing body counterpart (4) has a rounded end section (6) and is formed in a drop shaped manner.

5. A backflow preventer according to claim 1, wherein the through flow plate (7) has openings (9) which open into the passage channel (5).

6. A backflow preventer according to claim 5, wherein the through flow plate (7) in an area of the passage channel (5) comprises a sieve or perforated plate with honeycomb-shaped openings (9).

7. A backflow preventer according to claim 5, wherein the through flow plate (7) and the closing body counterpart (4) are connected to one another in one piece.

8. A backflow preventer according to claim 5, wherein the closing body (3) includes a closing body section held at the through flow plate (7) that contacts an interior circumference of the gas or liquid line (2) in a sealing manner.

9. A backflow preventer according to claim 8, wherein an upstream face edge region of the closing body (3), contacting the gas or liquid line (2) in a sealing manner, comprises an annular cross-sectional enlargement (10).

10. A backflow preventer according to claim 5, wherein the backflow preventer (1) is formed in two pieces and comprises the closing body (3), on the one hand, and the closing body counterpart (4), on the other hand, with the through flow plate (7) connected thereto in one piece.

11. A backflow preventer, which can be inserted into a gas or liquid line (2), comprising a closing body (3) embodied as a hollow body open on a drainage side, which limits a passage channel (5) between the closing body and a central closing body counterpart (4), the closing body (3) being displaceable by a flow medium flowing through the passage channel (5) in a flow direction (Pf 1) from a closed position, contacting the closing body counterpart (4) in a sealing manner, into an open position against a restoring force of an elasticity and/or a stability of the closing body, the closing body (3), in an unstressed closed position, initially contacts only a partial or edge region (6) of the closing body counterpart (4) with a partial region embodied as a sealing lip (12) of the closing body and can additionally be pressed against the closing body counterpart (4) with a partial region of a longitudinal extension thereof under a pressure of the fluid flowing against the flow direction (Pf 1), opening a downstream buffer volume for back flowing fluid, the closing body (3) is located at a fixed position, at a peripheral edge (10) thereof, relative to the closing body counterpart (4) in the backflow preventer in the gas or liquid line, and the central closing body counterpart (4) is connected to a through flow plate (7) having openings (9) which open into the passage channel (5), wherein the closing body (3) is held at the exterior circumference of the through flow plate (7).

12. A backflow preventer, which can be inserted into a gas or liquid line (2), comprising a closing body (3) embodied as a hollow body open on a drainage side, which limits a passage channel (5) between the closing body and a central closing body counterpart (4), the closing body (3) includes a closing body section held at the through flow plate (7) that contacts an interior circumference of the gas or liquid line (2), an upstream face edge region of the closing body (3) contacts the gas or liquid line (2) in a sealing manner and comprises an annular cross-sectional enlargement (10), the closing body (3) is displaceable by a flow medium flowing through the passage channel (5) in a flow direction (Pf 1) from a closed position, contacting the closing body counterpart (4) in a sealing manner, into an open position against a restoring force of an elasticity and/or a stability of the closing body, the closing body (3), in an unstressed closed position, initially contacts only a partial or edge region (6) of the closing body counterpart (4) with a partial region embodied as a sealing lip (12) of the closing body and can additionally be pressed against the closing body counterpart (4) with a partial region of a longitudinal extension thereof under a pressure of the fluid flowing against the flow direction (Pf 1), opening a downstream buffer volume for back flowing fluid, the closing body (3) is located at a fixed position, at a peripheral edge (10) thereof, relative to the closing body counterpart (4) in the backflow preventer in the gas or liquid line, and the central closing body counterpart (4) is connected to a through flow plate (7) having openings (9) which open into the passage channel (5) wherein the closing body (3) is held with the cross-sectional enlargement in a fastening groove (11) provided in an exterior circumference of the through flow plate (7).

\* \* \* \* \*